(12) United States Patent
Ajichi et al.

(10) Patent No.: US 7,920,227 B2
(45) Date of Patent: Apr. 5, 2011

(54) ILLUMINATION DEVICE AND LIQUID CRYSTAL DISPLAY DEVICE

(75) Inventors: Yuhsaku Ajichi, Nara (JP); Takeshi Masuda, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 123 days.

(21) Appl. No.: 12/305,643

(22) PCT Filed: May 25, 2007

(86) PCT No.: PCT/JP2007/060668
§ 371 (c)(1),
(2), (4) Date: Dec. 18, 2008

(87) PCT Pub. No.: WO2008/050504
PCT Pub. Date: May 2, 2008

(65) Prior Publication Data
US 2009/0207339 A1    Aug. 20, 2009

(30) Foreign Application Priority Data
Oct. 27, 2006  (JP) .................................. 2006-293238

(51) Int. Cl.
*G02F 1/13357* (2006.01)
(52) U.S. Cl. .......................................... 349/64; 362/97.3
(58) Field of Classification Search .................. None
See application file for complete search history.

(56) References Cited

U.S. PATENT DOCUMENTS
| | | | |
|---|---|---|---|
| 5,453,855 A | 9/1995 | Nakamura et al. | |
| 7,407,316 B2 * | 8/2008 | Noh et al. | 362/612 |
| 2005/0219836 A1 | 10/2005 | Hung | |
| 2006/0002146 A1 | 1/2006 | Baba | |
| 2006/0083019 A1 * | 4/2006 | Hahm et al. | 362/555 |
| 2006/0092348 A1 * | 5/2006 | Park | 349/64 |
| 2006/0208269 A1 | 9/2006 | Kim et al. | |
| 2006/0215386 A1 | 9/2006 | Hatanaka et al. | |
| 2007/0086179 A1 * | 4/2007 | Chen et al. | 362/27 |
| 2007/0086181 A1 | 4/2007 | Hatanaka et al. | |

FOREIGN PATENT DOCUMENTS
| | | |
|---|---|---|
| CN | 1716042 A | 1/2006 |
| EP | 0650010 A1 | 4/1995 |
| JP | 6-69903 U | 9/1994 |
| JP | 7-72815 A | 3/1995 |
| JP | 7-94008 A | 4/1995 |
| JP | 2001-307526 A | 11/2001 |
| JP | 2004-170698 A * | 6/2004 |
| JP | 2005-44661 A | 2/2005 |
| JP | 2005-117023 A | 4/2005 |
| JP | 2005-284283 A | 10/2005 |
| JP | 2006-261663 A | 9/2006 |

* cited by examiner

*Primary Examiner* — Mike Stahl
(74) *Attorney, Agent, or Firm* — Birch, Stewart, Kolasch and Birch, LLP

(57) ABSTRACT

A liquid crystal display device (1) of the present invention includes a display panel (3) and a backlight (2) (an illumination device). The backlight (2) includes a light-emitting layer (20) in which a plurality of light sources (5) are scattered and a diffuser (7) (a diffusion layer) that is formed on the light-emitting layer and diffuses light from the light-emitting layer. The light sources (5) that are present within the light-emitting layer (20) emit light in a direction (a direction of an arrow) substantially parallel to a boundary surface between the light-emitting layer (20) and the diffuser (7). In the diffuser (7), a transmittance of light in an area (7c) close to each of the light sources is smaller than a transmittance of light in an area that is far from each of the light sources.

16 Claims, 7 Drawing Sheets

ILLUMINATION DEVICE AND LIQUID CRYSTAL DISPLAY DEVICE

TECHNICAL FIELD

The present invention relates to (i) an illumination device that is used as, for example, a backlight of a liquid crystal display device and (ii) a liquid crystal display device including the illumination device.

BACKGROUND ART

In recent years, a liquid crystal display device has been prevailing in place of a CRT (Cathode Ray Tube). The liquid crystal display device is widely used as, for example, a liquid crystal television, a monitor, and a mobile phone, by taking advantages such as an energy saving characteristic, a small thickness, and a light weight. Improvement of an illumination device (so-called backlight) that is provided on a backside of the liquid crystal display device is one method for taking such advantages more effectively.

Illumination devices are broadly classified mainly into a sidelight type (an edge-light type) and a direct type. A sidelight type illumination device is provided with a light guide on a backside of a liquid crystal display panel. Side end section(s) of the sidelight type illumination device is(are) provided with a light source(s). Lights that are emitted from the light sources are reflected by the light guide, so that the liquid crystal display panel is uniformly and indirectly illuminated. An illumination device that is realized according to the arrangement can have a reduced thickness and excellent luminance uniformity, though the luminance of the illumination device becomes low. Accordingly, the sidelight type illumination device is mainly used in medium-size and small-size liquid crystal display devices such as mobile phones and laptop computers.

A direct-type illumination device is provided with a plurality of light sources on a backside of a liquid crystal display panel. In the direct-type illumination device, a liquid crystal display panel is directly illuminated. Accordingly, a high luminance can be easily obtained, even in the case of a wide screen. Therefore, the direct-type illumination device is mainly used in a large-screen liquid crystal display device having a screen larger than a 20-inch screen. However, currently, the direct-type illumination device has a thickness of approximately 20 mm to 40 mm. This thickness is an obstacle for further reducing a thickness of the display device.

For further reducing a thickness of the large-screen liquid crystal display device, a distance between light sources and a liquid crystal panel should be shortened. However, in such a case, unless the number of the light sources is increased, luminance uniformity of the illumination device cannot be obtained. On the other hand, in a case where the number of the light sources is increased, cost of the display device increases. Therefore, it is desired to develop, by causing no increase in the number of light sources, an illumination device that has excellent luminance uniformity.

[Patent Document 1]
Japanese Unexamined Patent Publication No. 117023/2005 (Tokukai 2005-117023) (published on Apr. 28, 2005)
[Patent Document 2]
Japanese Unexamined Patent Publication No. 284283/2005 (Tokukai 2005-284283) (published on Oct. 13, 2005)
[Patent Document 3]
Japanese Unexamined Patent Publication No. 307526/2001 (Tokukai 2001-307526) (published on Nov. 2, 2001)
[Patent Document 4]
Japanese Unexamined Patent Publication No. 94008/1995 (Tokukaihei 7-94008) (published on Apr. 7, 1995)

DISCLOSURE OF INVENTION

Conventionally, in order to solve the problems, it is attempted to obtain uniform illumination by providing a light-shielding section whose density decreases from sections close to light sources for a diffusion layer to sections far from the light sources.

For example, Patent Document 1 proposes an illumination device capable of emitting uniform light. This illumination device has a structure in which a density of a light-shielding layer varies in accordance with a distance from a linear light source made of a fluorescent tube.

However, in a case where the light source is made of a fluorescent tube as in the case of Patent Document 1, an intensity of light that is emitted from the light source is the same in all directions and a light-emitting surface of the illumination device is directly illuminated. Accordingly, unless a light-shielding layer having a considerably large density is provided right above the florescent light directly illuminating the light-emitting surface, illumination does not become uniform. However, the arrangement including such a light-shielding layer reduces efficiency in utilization of light in the illumination device. Further, for obtaining an illumination device whose efficiency is not reduced and that has excellent luminance uniformity, a distance between the light-shielding section and the light sources needs to be large. However, this arrangement increases a thickness of the illumination device.

Patent Document 2 also proposes an illumination device that can emit uniform light. This illumination device has a structure in which fine reflecting sections are scattered so that a ratio of an area that is occupied by the fine reflecting sections decreases, in a diffusion layer provided right above point light sources, from a center section close to each of the point light sources to a section apart in a radial direction from each of the center sections.

However, in the illumination device as disclosed in Patent Document 2, an intensity of light that is emitted from each of the light sources becomes the highest in a direction of a light-emitting surface of the illumination device. Accordingly, unless a considerably large reflecting layer is provided to a section right above each of the light sources, a luminance of the light-emitting surface does not become uniform. This arrangement including such a reflecting layer reduces efficiency in utilization of light in the illumination device. Further, for obtaining an illumination device whose efficiency is not reduced and that has excellent luminance uniformity, a distance between the reflecting layer and the light sources needs to be large. This arrangement increases a thickness of the illumination device.

Patent Document 3 proposes a light-weight illumination device that does not use a light guide. This illumination device has a structure that uses the air, as a light guide layer, in place of a light guide that is generally used in a sidelight type illumination device.

However, in the illumination device as disclosed in Patent Document 3, light sources are kept out of sight by a housing section that forms an edge surface. In such a structure, the light sources can be provided only to an edge of the illumination device. As a result, an intensity of light becomes insufficient in a large illumination device. Moreover, because the light sources are provided in a concentrated manner to the edge of the illumination device, a temperature of the light source section becomes high. This becomes a cause of deterioration in efficacy of the light sources and/or deterioration in life duration of the light sources. This hinders an increase in size of the illumination device.

Patent Document 4 also proposes a light-weight illumination device that has a structure utilizing the air as a light guide layer in place of a light guide.

However, when a size of the illumination device as disclosed in Patent Document 4 is increased, luminance uniformity can be maintained by keeping, out of sight with the use of a picture frame of the illumination device, a dark section that is produced by blocking light of a light source in a case where the number of the light source is one. However, in such a case, an intensity of light is insufficient.

The present invention is attained in view of the above problems. An object of the present invention is to provide an illumination device that makes it possible to prevent loss in an intensity of light and has excellent luminance uniformity, and to realize a large-screen and thin display device.

In order to solve the above problems, an illumination device of the present invention includes: a light-emitting layer in which a plurality of light sources are scattered; and a diffusion layer that is formed on the light-emitting layer and diffuses light from the light-emitting layer, the diffusion layer having a transmittance of light in an area close to each of the light sources which transmittance is smaller than a transmittance of light in an area that is far from each of the light sources, the light sources each having directivity in a light emission direction, the directivity being such that a light component in a direction parallel to a boundary surface between the light-emitting layer and the diffusion layer is larger than a light component in a direction perpendicular to the boundary surface.

Here, the description that "the light sources each having directivity in a light emission direction" means that an intensity of light that is emitted from each of the light sources varies depending on a direction.

According to the arrangement, the light from each of the light sources scattered in the light-emitting layer has directivity. This directivity is such that the intensity of light emitted becomes high in a direction parallel to a boundary surface between the light-emitting layer and the diffusion layer. This makes it possible to transmit light all over the light-emitting layer. At the same time, the arrangement reduces an intensity of light that directly illuminates the diffusion layer from the light source. This allows a luminance of the light emitted from the light-emitting layer to be uniform all over the layer. Accordingly, it becomes possible to reduce a distance between the light source and the diffusion layer which distance is required for obtaining constant luminance uniformity. As a result, a thickness of the illumination device can be reduced. For the purpose of further improving the luminance uniformity, it is preferable that a main emission direction of light (a direction in which a luminance of the light emitted becomes maximum) is a direction parallel to a boundary surface between the light-emitting layer and the diffusion layer.

Further, a transmittance of the diffusion layer in an area close to each of the light sources is smaller than that in an area far from the light source, Accordingly, it is possible to suppress an intensity of light that is emitted upward directly from the light source. This can realize an illumination device that is excellent in luminance uniformity.

The light from the light source is emitted in a direction in which the light-emitting layer is extended. This makes it unnecessary to suppress a transmittance of the diffusion layer in the area close to the light source up to a transmittance in a conventional case where light from a light source directly enters the diffusion layer. This prevents a loss in utilization efficiency of light.

Accordingly, with the use of the illumination device of the present invention, it is possible to realize an illumination device (i) that has excellent luminance uniformity even in a case where a light-emitting area is increased and (ii) that is efficient because a loss in the intensity of light is suppressed.

In addition to the above arrangement, in the illumination device of the present invention, it is preferable that: light-emitting directions of at least two light sources out of the plurality of light sources are different from each other.

According to the arrangement, light emission directions of at least two light sources differ form each other. This makes it possible to transmit light all over the light-emitting layer. In other words, an area that cannot be illuminated by one light source can be illuminated by the other light source. Accordingly, even in a case where the light-emitting area is increased, it becomes possible to realize an illumination device that is excellent in the luminance uniformity. As a result, it becomes possible to suitably apply the illumination device of the present invention to a backlight of a large display device. The light emission direction here indicates a direction of light that is emitted from the light source.

In the illumination device of the present invention, it is preferable that: each of the light sources is made of a light emitting diode.

According to the arrangement, both a size and a thickness of the light source can be reduced. Accordingly, the thickness of the illumination device can be further reduced. Because the light emitting diode can keep the light emission direction constant, light from the light source can reliably have directivity in a case where the light emitting diode is used as the light source. As a result, the light emission direction of the light source can be reliably kept in a direction in which the light-emitting layer is extended.

In the illumination device of the present invention, it is preferable that: in the diffusion layer, as a distance from each of the light sources increases, a size of diffusing particles that are filled in the diffusion layer becomes smaller.

According to the arrangement, a degree of diffusion of light is varied, by varying a size of the diffusing particles depending on a position. Accordingly, the transmittance of the diffusion layer can be easily varied depending on a distance from the light source. As explained above, by arranging the size of the diffusing particles to become smaller as a distance from the light source increases, the transmittance of light in the area close to the light source can be arranged to be smaller than the transmittance of light in the area that is far from the light source. This is because, when the size of the diffusing particles becomes small in a case where the number of the diffusing particles is the same, a possibility of collision between light and the diffusing particles decreases. Consequently, the transmittance increases.

In the illumination device of the present invention, it is preferable that: in the diffusion layer, as a distance from each of the light sources increases, a density of the diffusing particles that are filled in the diffusion layer becomes smaller.

According to the arrangement, a degree of diffusion of light is varied, by varying a density of the diffusing particles depending on a position. Accordingly, in accordance with a distance from the light source, a transmittance of the diffusion layer can be easily varied. As explained above, the density of the diffusion particles is arranged to decrease as the distance form the light source increases. As a result, the transmittance of light in the area that is close to the light source can be arranged to be smaller than a transmittance of the light in the area that is far from the light source.

In the illumination device of the present invention, it is preferable that: in the diffusion layer, a reflecting material that reflects light is provided in the area that is close to each of the light sources.

The reflecting material is a material that has a larger reflectivity of light compared with other materials that constitute the diffusion layer. According to the arrangement, the reflecting material is provided in the area close to the light source. This makes it possible to reduce the transmittance in the area close to the light source, compared with the transmittance in the area that is far form the light source. This makes it possible to realize the illumination device that is excellent in the luminance uniformity.

In the illumination device of the present invention, it is preferable that: a light-shielding treatment is provided between an area in which each of the light sources is provided in the light-emitting layer and the diffusion layer.

According to the arrangement, an intensity of light that enters the diffusion layer directly from the light source can be further reduced. As a result, the intensity of light that is emitted from the light-emitting surface of the illumination device is prevented from becoming ununiform depending on a position of the light-emitting layer. This makes it possible to more reliably prevent the luminance from becoming ununiform.

In the illumination device of the present invention, it is preferable that: at least two light sources of the light sources are provided so as to face each other, and one of the two light sources is arranged to provide light towards another one of the two light sources.

According to the arrangement, each of the light sources illuminates an area (dead area) that cannot be illuminated by other light source, so as to compensate each other. Accordingly, the light emitted from each of the light sources covers a dead area of other light source, so that light is emitted from all over the light-emitting surface. As a result, it becomes possible to obtain an illumination device that does not have a dark section.

A liquid crystal display device of the present invention includes, as a backlight, any one of the illumination devices as described above.

The liquid crystal display device of the present invention includes the illumination device of the present invention as described above. This allows the liquid crystal display device of the present invention to have a sufficient luminance and excellent luminance uniformity even in a case where the liquid crystal display device has an increased size and a reduced thickness.

For a fuller understanding of the nature and advantages of the invention, reference should be made to the ensuing detailed description taken in conjunction with the accompanying drawings.

BRIEF DESCRIPTION OF DRAWINGS

FIG. 5(a) is a graph showing the transmittance by color strength.

FIG. 5(b) is a graph showing the transmittance by a height.

Figure 1:
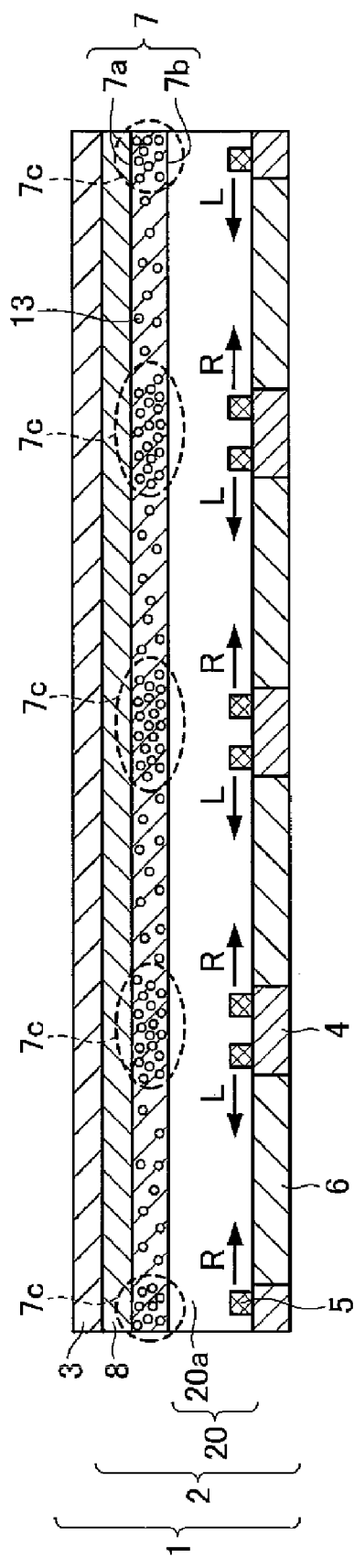
FIG. 1 is a cross sectional view illustrating a structure of a liquid crystal display device according to one embodiment of the present invention.

| Reference Numerals | |
|---|---|
| 1 | Liquid Crystal Display Device |
| 2 | Backlight (Illumination Device) |
| 4 | Substrate |
| 5 | Light Source |
| 5a | Light Source |
| 5a' | Light Source |
| 6 | Reflection Sheet |
| 7 | Diffuser (Diffusion Layer) |
| 20 | Light-Emitting Layer |

BEST MODE FOR CARRYING OUT THE INVENTION

The following illustratively explains one embodiment of the present invention in details, with reference to drawings. Unless a specific explanation is provided particularly, dimensions, materials, shapes, and relative positions of constituent sections as described in this embodiment are merely illustrative examples and by no means limit the scope of the present invention.

The present embodiment provides an explanation on an illumination device that is used as a backlight of a liquid crystal display device, with reference to FIGS. 1 through 8.

FIG. 1 shows a liquid crystal display device 1 of the present embodiment. The liquid crystal display device 1 includes a backlight 2 (an illumination device) and a liquid crystal display panel 3. An arrangement of the liquid crystal display panel 3 is the same as a general liquid crystal display panel that is used in a conventional liquid crystal display device, and an explanation thereof is omitted. The following explains in detail an arrangement of the backlight 2 that is provided in the liquid crystal display device 1.

The backlight 2 is provided to a back of the liquid crystal display panel 3 (on a side opposite to a display surface). As illustrated in FIG. 1, the backlight 2 includes substrates 4, light sources 5 each including, as a light-emitting element, a side-emission type LED (Light Emitting Diode), reflection sheets 6, a diffuser (a diffusion layer) 7, and an optical sheet 8.

The plurality of light sources 5 are provided in a space 20a (an air layer in which the air is sealed) that is provided on a flat plate made of the substrates 4 and the reflection sheets 6. In other words, the backlight 2 has a structure in which a light-emitting layer 20 including the plurality of light sources 5, the diffuser 7 (the diffusion layer) 7, and the optical sheet 8 are provided in this order on the substrates 4 and the reflection sheets 6.

The light emitting layer 20 is not limited to an arrangement that includes light sources within the space 20a. For example, the light-emitting layer 20 may have an arrangement in which light sources that are point sources are provided inside a light guide made of, for example, transparent resin such as acryl resin or polycarbonate. In this case, hollow depressed sections are formed for providing the light sources inside the light guide, and the light sources are provided in the depressed sections. As a result, the light-emitting layer can be produced.

As a side-emission type LED constituting a light source 5, a set of R, G, and B chips in one package may be used. This makes it possible to obtain an illumination device that is capable of reproducing colors in a wide range. Each of the reflection sheets 6 is provided between the substrates 4. It is preferable that white substrates are used as the substrates 4 for improving luminance. The diffuser 7 is provided on an upper plane (on a side provided with the liquid crystal display panel 3) of the light-emitting layer 20 in which the plurality of light sources 5 are scattered.

The diffuser 7 diffuses light that is emitted from each of the light sources 5 inside the diffuser 7 and causes surface emission of light from a light-emitting surface 7a. The light-emitting surface 7a is a surface for illuminating a target of illumination. The diffuser 7 may be made of transparent resin such as acryl resin, polycarbonate, or polystyrene. A material of the diffuser 7 is not limited to this, but may be made of a material that is generally used for a diffuser.

The reflection sheets 6 reflect light and allow more light to be emitted from the light-emitting surface 7a.

According to the arrangement, the light emitted from each of the light sources 5 that are point sources travels between (i) the diffuser 7 and (ii) the reflection sheets 6 and the substrates 4, that is, within the space 20a, while the light is subjected to diffusion and reflection. Then, the light that travels within the space 20a exits from the space 20a to the diffuser 7 due to reflection caused by the reflection sheets 6. After the light is subjected to diffusion caused by the diffuser 7, the light exits from the light-emitting surface 7a and reaches the liquid crystal display panel 3 through the optical sheet 8. The optical sheet 8 may be made of, for example, a diffusion sheet, a prism sheet, or a polarization/reflection sheet. However, a material of the optical sheet 8 is not limited to these.

The following explains an emission direction of light (a direction in which light is emitted) from each of the light sources 5. In the backlight 2 of the present embodiment, different from a conventional direct-type backlight, no main component (a peak component of emitted light) in a light emission direction of each of the light sources is present in a direction perpendicular to the diffuser. The main component in the light emission direction of each of the light sources exists in a direction along the diffuser 7 (i.e., a direction in which the light-emitting layer extends). That is) a main light emission direction of each of the light sources is in the direction along the diffuser 7. This makes it possible to reduce light that directly enters the diffuser 7 from the light sources 5. Accordingly, distribution of bright and dark sections can be suppressed at an incidence plane 7b from which light enters the diffuser 7. As a result, a thickness of the backlight can be reduced.

In other words, each of the light sources 5 provided in the backlight 2 of the present invention have directivity in the light emission direction. The directivity is such that a light component in a direction parallel to a boundary surface between the light-emitting layer 20 and the diffuser 7 is larger than a light component in a direction perpendicular to the boundary surface.

An arrow in FIG. 1 shows a light emission direction of each of the light sources 5 that are provided in the backlight 2. As shown by the arrow, the light from each of the light sources 5 is emitted so as to travel along the light-emitting layer 20 (i.e., in a direction in which the layer extends). In other words, light is emitted from a side surface of each of the light-sources 5 that are provided on the substrates 4 and the light emission direction of each of the light sources 5 is substantially parallel to the direction in which the diffuser 7 extends. Further, emission directions of lights that are respectively emitted from two light sources 5 that are provided adjacent to each other are directions shown by arrows L and R, and these emission directions are different from each other. In this way, in the backlight 2 of the present invention, there are at least two directions in the directions of lights (orientations of lights) that are emitted from the plurality of light sources 5, respectively.

In this way, the emission direction of the light emitted from each of the light sources 5 is in a direction in which the light-emitting layer 20 extends. This makes it possible to reduce an intensity of light that directly exits from the light-emitting surface 7a. Accordingly, it becomes possible to prevent a light source disposition area (an area in which a light source is provided) from being brighter than other area. In addition, because the emission directions (light emission directions) of lights from two of the light sources 5 that are adjacent to each other are different from each other, light can be transmitted all over the light-emitting layer 20. Therefore, compared with a conventional backlight, luminance uniformity can be further improved.

In the present invention, it is the most preferable that the main emission direction of light from each of the light sources 5 is perfectly parallel to the boundary surface. However, the present invention is not necessarily limited to such an arrangement. In other words, any arrangement may be adopted, as long as each of the light sources 5 has directivity such that a light component in a direction parallel to a boundary surface between the light-emitting layer 20 and the diffuser 7 is larger than a light component in a direction perpendicular to the boundary surface. Further, it is preferable that the main emission direction of light from each of the light sources 5 is substantially parallel to the boundary surface between the light-emitting layer 20 and the diffuser 7.

Figure 2:
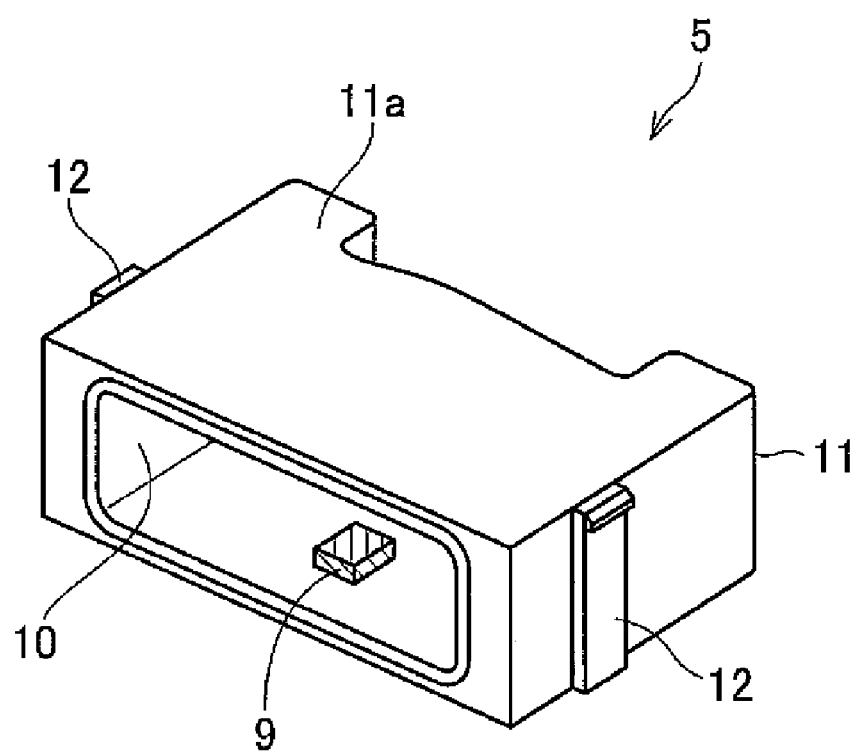
FIG. 2 is a perspective view illustrating a light source that is provided in an illumination device inside the liquid crystal display device as illustrated in FIG. 1.

FIG. 2 is a perspective view of a light source 5 that includes a side-emission type LED used in the backlight 2 of the present invention. The light source 5 includes an LED element 9, a molded resin 10, a package 11, and electrodes 12. The molded resin 10 allows light that is emitted from the LED element 9 to be efficiently emitted from the light source 5. The package 11 holds the LED element 9 and the molded resin 10. The electrodes 12 are for turning on the LED element 9.

On a surface 11a (a side facing the diffuser 7) of the package 11 is subjected to a light-shielding treatment so that the light emitted from the LED element 9 does not leak. A method of the light-shielding treatment may be any general light-shielding treatment. An example of the method of the light-shielding treatment is to provide a black coat on the surface 11a of the package 11 or to use metal as a material of the package 11 itself. Because the surface 11a of the package 11 of the light source 5 is subjected to the light-shielding treatment in this way, it becomes possible to further reduce an intensity of light that directly enters the diffuser 7 from the light source 5. This prevents an intensity of light that is emitted from the light-emitting surface of the illumination device from being uneven depending on a position. As a result, luminance can be prevented from becoming ununiform.

The present embodiment explains an example in which the surface 11a of the package 11 including the LED element 9 as above is subjected to a light-shielding treatment. The present invention is not limited to the arrangement. The present invention may employ any arrangement as long as a light-shielding treatment is provided between (i) an area in which the light source is provided within the light-emitting layer 20 and (ii) the diffuser 7. Accordingly, a lower surface of the diffuser 7 (i.e., the incidence plane 7b of light) in the light source disposition area may be subjected to a light-shielding treatment.

The following explains the diffuser 7. Diffusing particles 13 are filled inside the diffuser 7. The diffusing particles 13 are for diffusing light. In the present embodiment, the diffusing particles 13 are provided at a high density in the light source disposition area that is right above the light source (i.e., a section where the light source 5 overlaps the diffuser 7). In other areas, the diffusing particles are provided at a low density. In this way, in terms of density distribution, densities of the diffusing particles 13 vary depending on positions. This arrangement makes it possible that a transmittance of light in an area close to the light source 5 becomes smaller than a transmittance of light in an area far form the light source 5. Accordingly, it becomes possible to reduce an intensity of light that is exits from the diffuser 7 in a section close to the light source 5. This prevents the light source disposition area from being brighter than other areas.

A front surface (i.e., the light-emitting surface 7a) or a back surface (i.e., the incidence plane 7b) of the diffuser 7 may be subjected to a light-shielding treatment or a process (not illustrated) for reflecting light. By subjecting the front surface or the back surface of the diffuser to the light-shielding treatment or the process for reflecting light in this way, a degree of diffusion caused by the diffuser is improved. Consequently, an illumination device excellent in luminance uniformity can be obtained. As a result, it becomes possible to realize a liquid crystal display device excellent in luminance uniformity, In terms of the distribution in concentration of the above process, the concentration may be different depending on a position. For example, the distribution in concentration may be such that the concentration of the process is high right above the light source disposition area and the concentration is low in other areas. This makes it possible to reduce an intensity of light that directly exits from the diffuser 7. Consequently, the light source disposition area is prevented form being brighter than other areas.

Figure 3:
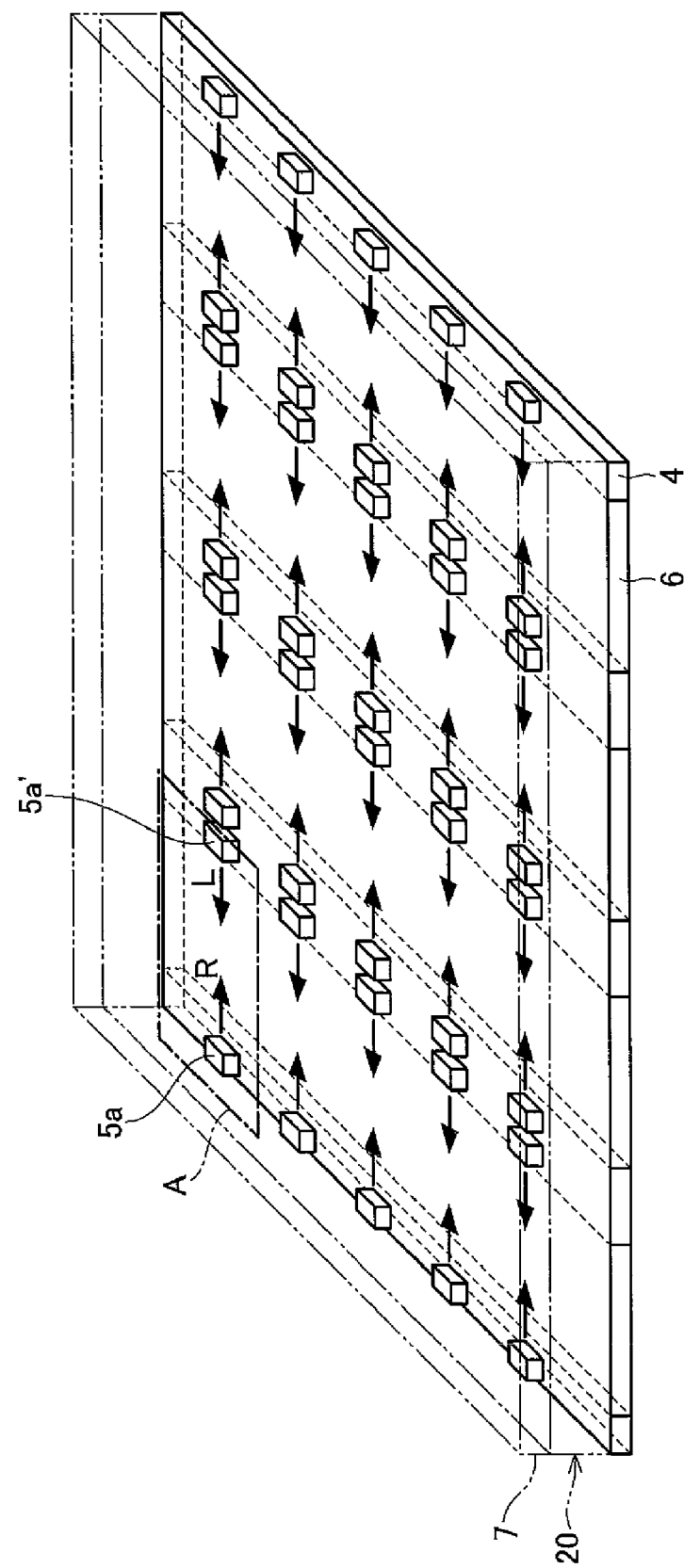
FIG. 3 is a perspective view illustrating one example of an arrangement of light sources in the illumination device inside the liquid crystal display device as illustrated in FIG. 1.

FIG. 3 is a perspective view illustrating one example of an arrangement of light sources in the backlight 2 of the present invention. FIG. 3 illustrates the light-emitting layer 20 in a case where the backlight 2 is seen through from the light-emitting surface. Arrows R and L in FIG. 3 show respective light emission directions (emission directions of light) of the light sources 5. In the backlight 2 of the present embodiment, as shown as the light sources 5a and 5a', two light sources are provided so as to face each other. Moreover, the light emission directions of the respective light sources are set, so that light from one light source 5a is provided towards the other light source 5a' while light from the other light source 5a' is provided towards the light source 5a.

In this way, in the backlight 2, the light sources are provided so that an area (a dead area) that cannot be illuminated by one of the light sources is covered by the other one of the light sources, and vice versa. Accordingly, the light emitted from one of the light sources is arranged to cover a dead area (an area which cannot be illuminated by the other one of the light sources) of the other one of the light sources and vice versa. Then, the lights exit from an entire surface of the light-emitting surface 7a. This makes it possible to obtain a backlight that does not have a dark section. As long as each of the light sources 5 is provided so as to cover an area that cannot be illuminated by another one of the light sources 5, the light sources 5 are not necessarily provided so as to face each other.

The diffuser 7 is provided above the light-emitting layer 20. The optical sheet 8 (not illustrated) is provided above the diffuser 7. The diffuser 7 of the present invention has an arrangement in which a transmittance varies depending on a position. There are various methods as a method of varying the transmittance depending on a position. For example, the transmittance may be varied, by changing a size (particle size) of the diffusing particles depending on a position or by varying a density of the diffusing particles depending on a position. Alternatively, the transmittance may be varied, by providing a reflecting material to a front surface (i.e., the light-emitting surface 7a) or a back surface (i.e., the incidence plane 7b) in a manner such that a reflectivity of the reflecting material is varied depending on a position.

In the present invention, as described above, the transmittance of light in the diffuser 7 varies depending on a position. The transmittance in the area close to the light source 5 is arranged to be smaller than the transmittance of the area far from the light source 5. Specifically, in a case where a relative transmittance in an area in which the transmittance is the highest (in an area that is the farthest from the light source) is assumed to be 1, a relative transmittance of an area (light source disposition area 7c) of the diffuser 7 right above the light source 5 is preferably $\frac{1}{7}$ to $\frac{1}{15}$. A transmittance in an area (this area is assumed to be an area 7d) other than the light source disposition area 7c of the diffuser 7 is arranged to be higher than the transmittance in the area 7c. It is preferable that, in the area 7d of the diffuser 7, the transmittance gradually increases as a distance from the light source 5 increases. In other words, it is preferable that, in the area 7d, a relative transmittance in a peripheral area of the light source disposition area 7c is higher than the transmittance of the light source disposition area 7c and lower than the transmittance of the area other than the light disposition area 7c (an area that is the farthest from the light source).

The diffusing particles may be any particles that are generally used as particles in a diffusion layer for diffusing light. Specific examples of the diffusing particles are beads that are made of transparent resin and bubbles made of the air. In one example of a method that is used as a method of varying diameters of the diffusing particles depending on positions, diameters of bubbles are controlled by control of an amount of UV irradiation and a heating temperature, and positions are controlled by patterning with the use of a mask. By using the method, a size of the diffusing particles is arranged to become smaller as a distance from the light source increases. As a result, the transmittance of light in the area 7c close to the light source can be arranged to be smaller than a transmittance of light in the area 7d far from the light source.

In a case where a density of the diffusing particles is varied depending on a position, a conventional method that is generally used may be employed. With the use of the conventional method, the density of the diffusing particles is arranged to become higher as a distance from the light source decreases. As a result, the transmittance of light in the area 7c that is close to the light source may be arranged to be smaller than the transmittance of light in the area 7d that is far from the light source.

In a case where a transmittance of the diffuser 7 is varied depending on a position with the use of a reflecting material, the reflecting material is not particularly limited. Any generally used reflecting material may be used. An example of the reflecting material is a white ink in which a white powder made of, for example, titanium oxide or barium sulfate, is dissolved. It is a generally known method that a reflecting material is provided on a front surface or a back surface of the diffuser and a transmittance is varied depending on a position. This method can be carried out by printing such as silk screening. In silk screening, a density of printing can be varied depending on a position. Therefore, a transmittance and a reflectivity of the diffuser can be controlled by the silk screening. Examples of an ink that may be used for the printing are a volatile white ink, a white UV ink, and a metal ink such as an ink made of aluminum. In the present invention, the reflecting material may be provided only to the light source disposition area 7c that is closer to the light source 5.

The transmittance is varied depending on a position according to the method described above. This allows luminance distribution of the illumination device to be uniform and, consequently, makes it possible to obtain an illumination device that is excellent in luminance uniformity.

Figure 4:
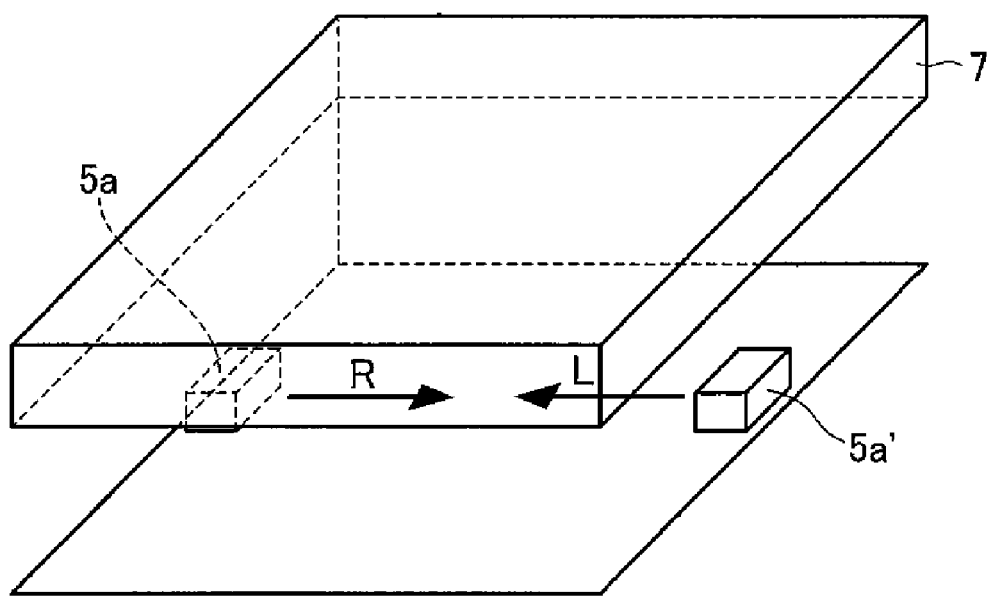
FIG. 4 is a perspective view illustrating a section A of the illumination device as illustrated in FIG. 3.

FIG. 4 is a perspective view of a section A in FIG. 3. The two light sources 5a and 5a' are arranged to face each other as illustrated, so that each one of the light sources 5a and 5a' can cover an area which cannot be illuminated by the other one of the light sources 5a and 5a'. Accordingly, an entire surface can be illuminated. This makes it possible to realize a backlight 2 that has better luminance uniformity.

Figure 5A:
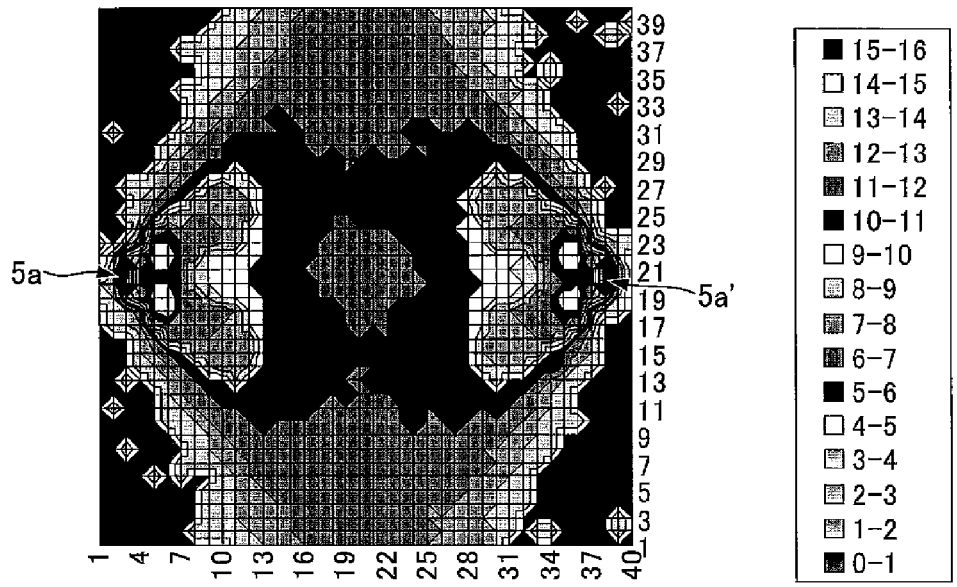
FIG. 5(a) is a diagram illustrating a distribution of a transmittance of a diffuser. Specifically.
Figure 5B:
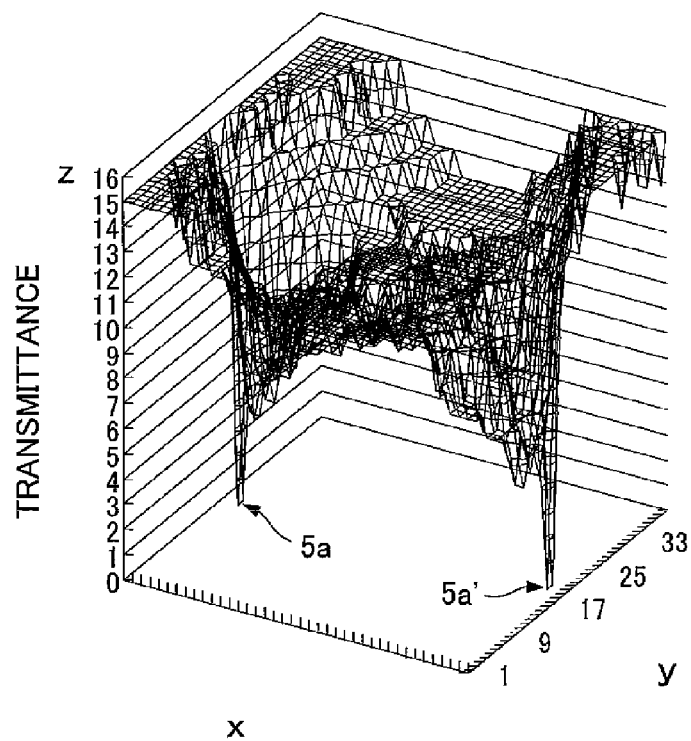
FIG. 5(b) is a diagram illustrating a distribution of a transmittance of a diffuser. Specifically.

FIGS. 5(a) and 5(b) shows a distribution of a transmittance of the diffuser 7. Here, a case including two light sources 5 is raised as an example, in a manner corresponding to FIG. 4. The reference numerals 5a and 5a' in edge surfaces indicates the light sources. The light sources 5a and 5a' are provided so as to emit light in inward directions, respectively. By varying the transmittance of the diffuser as illustrated in FIGS. 5(a) and 5(b), it is possible to obtain an illumination device that is excellent in luminance uniformity. Values in FIGS. 5(a) and 5(b) are relative values of transmittances. The lower the value is, the lower the transmittance becomes. In other words, a case where the value in FIGS. 5(a) and 5(b) is twice as much indicates that the transmittance is also twice as much. In a case where a relative transmittance is 1 in an area whose transmittance is the highest, a relative transmittances in other area becomes a value obtained by dividing the value in FIGS. 5(a) and 5(b) by approximately 15.5.

Figure 6:
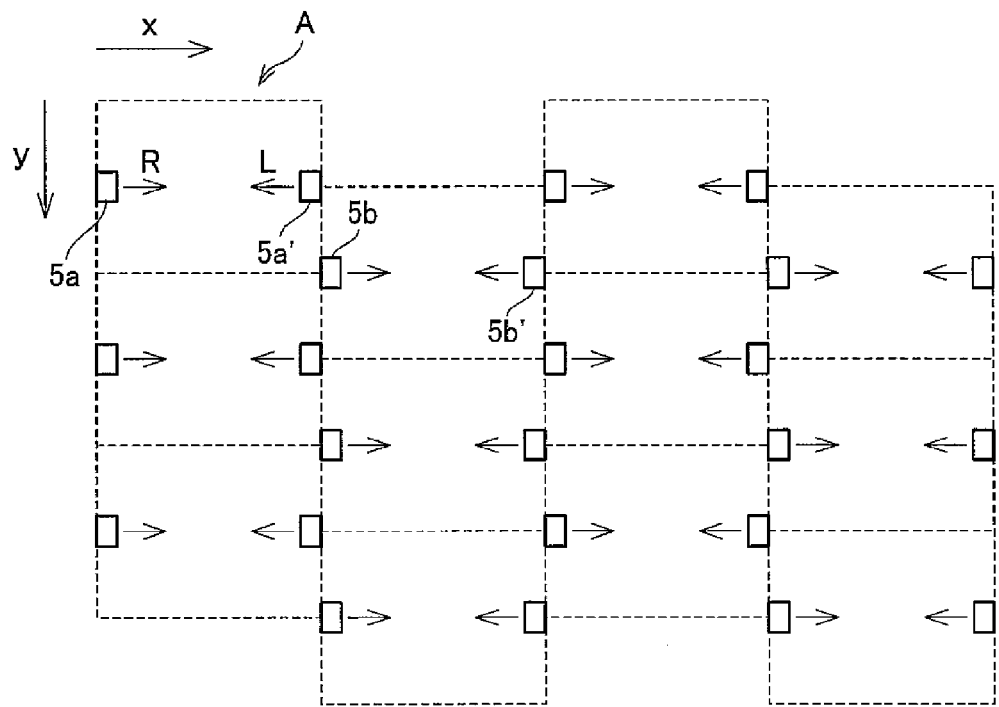
FIG. 6 is a plan view illustrating another example of an arrangement of light sources in the illumination device of the present invention.
Figure 7:
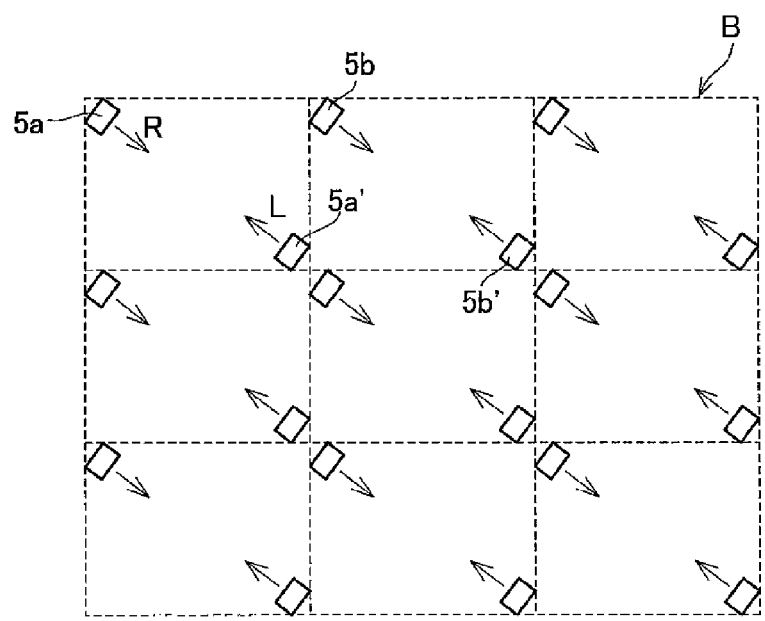
FIG. 7 is a plan view illustrating still another example of an arrangement of light sources in the illumination device of the present invention.
Figure 8:
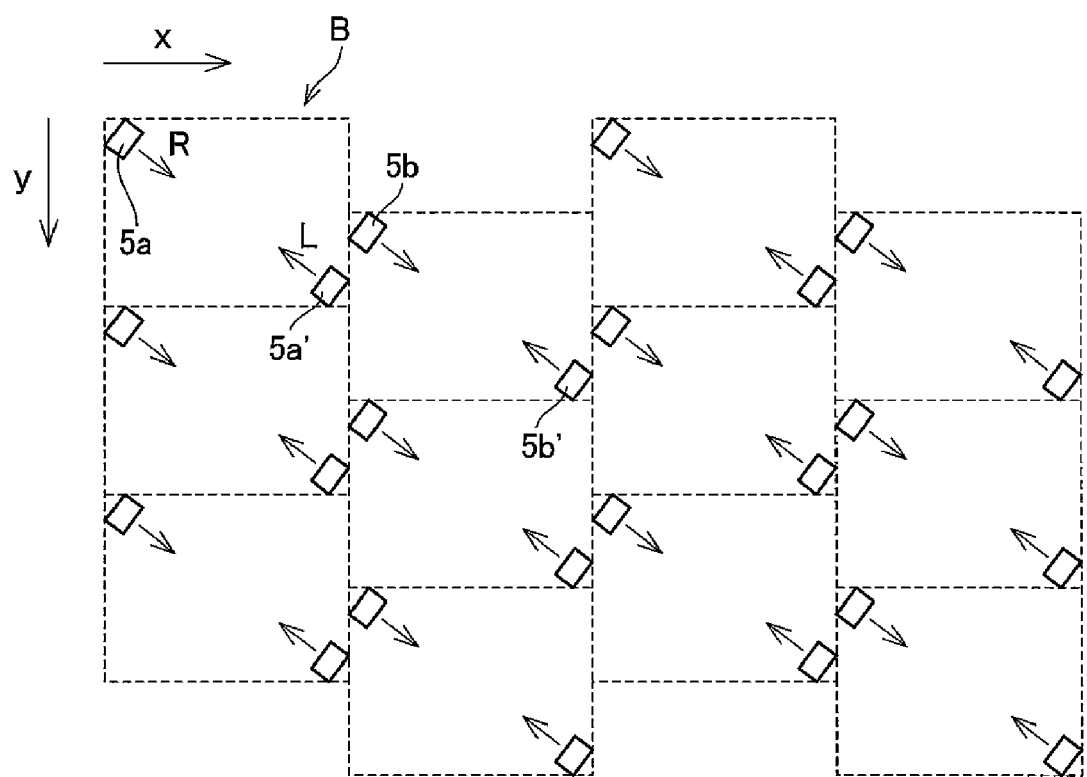
FIG. 8 is a plan view illustrating yet another example of an arrangement of light sources in the illumination device of the present invention.

FIGS. 6, 7, and 8 are plan views each illustrating an example of an arrangement of the light sources 5 (5a, 5a') in the backlight 2 of the present invention. Substantially the same effect as in an arrangement as shown in FIG. 3 can be obtained from arrangements as shown in FIGS. 6 to 8.

In FIG. 6, unit structures A each made of a combination of two light sources 5a and 5a' as illustrated in FIG. 4 are provided alternately in a direction x. That is, the light source 5a' that is provided in one unit structure A is provided so that the light source 5a' does not come close to a light source 5b that is provided in another unit structure A that is adjacent, in the direction x, to the unit structure A including the light source 5a'. On the other hand, unit structures A that are adjacent to each other in a direction y is provided in a line in the same manner as illustrated in FIG. 3.

An LED heats up when the LED emits light. Depending on a type of the LED, light emission efficiency varies according to a temperature. In general, when the temperature becomes too high, the light emission efficiency deteriorates. Accordingly, in a case where an LED is used as the light source, it is necessary to cause the LED to dissipate heat so that the light emission efficiency of the LED is maintained. By arranging the unit structures A adjacent to each other to be provided alternately in the direction x in a manner as described above, a plurality of light sources are provided at constant intervals. This prevents the light sources from being provided close to one another. As a result, heat dissipation performance can be improved and light emission efficiency of the LED can be maintained.

In an example of an arrangement of the light sources as illustrated in FIG. 7, the two light sources 5a and 5a' are provided to angle sections of a unit structure B that has a rectangle shape in a case where the light-emitting surface 7a is viewed from a position directly above the light-emitting surface 7a. The two light sources 5a and 5a' are on a diagonal line of the rectangle. Because the light sources 5a and 5a' are provided in this way, a corner section that becomes a dark section is not produced. This makes it possible to obtain an illumination device that has better luminance uniformity.

In an example of an arrangement of the light sources as illustrated in FIG. 8, a unit structure is the same as the unit structure B as illustrated in FIG. 7. However, in FIG. 8, unit structures B adjacent to each other are provided alternately in a direction x. That is, the light source 5a' that is provided in one unit structure B is provided not to be close to the light source 5b that is provided in another unit structure B that is adjacent, in the direction x, to the unit structure B including the light source 5a'. On the other hand, in the direction y, the unit structures B adjacent to each other are provided in a line.

In a case where LEDs are used as light sources, it is necessary to cause the LEDs to dissipate heat. As explained above, the unit structures B that are adjacent to each other in the direction x are provided alternately. As a result, a plurality of light sources are provided at constant intervals. This prevents the light sources from being provided close to one another. As a result, heat dissipation performance can be improved.

The above examples illustrate a structure of the illumination device of the present invention. However, the present invention is not necessarily limited to the above arrangement (that is, an arrangement in which two light sources are provided so as to face each other). A plurality of light sources that are provided in the illumination device may be provided in any arrangement as long as light emission directions of at least two light sources in the illumination device are different from each other. Therefore, there may be three or more light emission directions of the light sources. Alternatively, the light sources may be provided randomly in a completely irregular manner. Moreover, two of the light sources are not necessarily provided so as to face each other.

The illumination device of the present invention is excellent in luminance uniformity even in a case where the light-emitting area increases. Accordingly, it is preferable that the illumination device of the present invention is used as a backlight of, in particular, a liquid crystal display device including a large screen. However, the use of the illumination device is not limited to this. The illumination device may be used as a backlight of any liquid crystal display device. Further, the illumination device of the present invention may be used as an illumination for, other than a liquid crystal display device, an interior lightening or an outside bulletin board.

The present invention does not go beyond the scope of the key features as explained above and can be applied in various ways. The above embodiment provides mere examples in any ways. The present invention should not be narrowly interpreted within the limits of such an embodiment. The scope of the present invention is shown in the claims and not limited by the contents of the specification. Further, the present invention encompasses all modifications and variations, and processes within the equivalent of the claims.

INDUSTRIAL APPLICABILITY

The illumination device of the present invention is applicable to a backlight of the liquid crystal display device. The illumination device of the present invention can be suitably used as, in particular, a backlight of a large-screen liquid crystal display device.

The invention claimed is:

1. An illumination device comprising:
   a light-emitting layer in which a plurality of light sources are scattered; and
   a diffusion layer that is formed on the light-emitting layer and diffuses light from the light-emitting layer,
   the diffusion layer having a transmittance of light in an area close to each of the light sources which transmittance is smaller than a transmittance of light in an area that is far from each of the light sources,
   the light sources each having directivity in a light emission direction, the directivity being such that a light component in a direction parallel to a boundary surface between the light-emitting layer and the diffusion layer is larger than a light component in a direction perpendicular to the boundary surface, and
   a plurality of unit structures each of which is made up of two of the light sources that are arranged to face each other, and are alternately arranged so that the light sources of unit structures that are adjacent to one another are not in alignment with one another.

2. The illumination device as set forth in claim 1, wherein:
   light emission directions of at least two light sources out of the plurality of light sources are different from each other.

3. The illumination device as set forth in claim 1, wherein:
   each of the light sources is made of a light emitting diode.

4. The illumination device as set forth in claim 1, wherein:
   in the diffusion layer, as a distance from each of the light sources increases, a size of diffusing particles that are filled in the diffusion layer becomes smaller.

5. The illumination device as set forth in claim 1, wherein:
   in the diffusion layer, as a distance from each of the light sources increases, a density of the diffusing particles that are filled in the diffusion layer becomes smaller.

6. The illumination device as set forth in claim 1, wherein:
   in the diffusion layer, a reflecting material that reflects light is provided in the area that is close to each of the light sources.

7. The illumination device as set forth in claim 1, wherein:
   a light-shielding treatment is provided between an area in which each of the light sources is provided in the light-emitting layer and the diffusion layer.

8. The illumination device as set forth in claim 1, wherein:
   at least one of the two light sources that are arranged to face each other is arranged to provide light towards the other one of the two light sources.

9. A liquid crystal display device comprising, as a backlight, an illumination device as set forth in claim 1.

10. A liquid crystal display device comprising, as a backlight, an illumination device as set forth in claim 2.

11. A liquid crystal display device comprising, as a backlight, an illumination device as set forth in claim 3.

12. A liquid crystal display device comprising, as a backlight, an illumination device as set forth in claim 4.

13. A liquid crystal display device comprising, as a backlight, an illumination device as set forth in claim 5.

14. A liquid crystal display device comprising, as a backlight, an illumination device as set forth in claim 6.

15. A liquid crystal display device comprising, as a backlight, an illumination device as set forth in claim 7.

16. A liquid crystal display device comprising, as a backlight, an illumination device as set forth in claim 8.

* * * * *